United States Patent Office 3,717,691
Patented Feb. 20, 1973

3,717,691
TRI-[p-(2-BUTENYL)-PHENYL]-PHOSPHITE
Frederick Harold Howell, Maghull, near Liverpool, and
Wilfred Pickles, Stockport, England, assignors to Ciba-
Geigy Corporation, Ardsley, N.Y.
No Drawing. Filed Nov. 20, 1969, Ser. No. 878,568
Claims priority, application Great Britain, Dec. 3, 1968,
57,190/68, 57,191/68
Int. Cl. C07f 9/12; C08f 45/58
U.S. Cl. 260—956                    1 Claim

ABSTRACT OF THE DISCLOSURE

Tri-[p-(2-butenyl)-phenyl]-phosphate and -phosphite and tri-[p-(2,3-epoxybutyl)-phenyl]-phosphate are stabilizers of organic material. The compounds are obtained by (a) contacting p-(2-butenyl)-phenol with a phosphorylating agent,
(b) contacting p-(2-butenyl)-phenol with a phosphorus trihalide, and
(c) contacting the products of (a) or (b) with an epoxidising agent.

---

The present invention relates to novel chemical compounds and in particular to a new organic phosphate and a new organic phosphite and to processes of producing these compounds.

According to the present invention, there are provided compounds having the Formula I:

  (I)

wherein $n$ is 0 or 1, and having the Formula II:

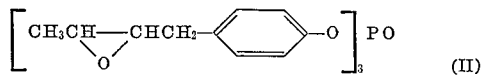  (II)

The tri-[p-2-butenyl)-phenyl]-phosphate is produced by contacting p-(2-butenyl)-phenol with a phosphorylating agent.

The phosphorylation process may be conveniently carried out using any of a wide range of phosphorylation reaction techniques. The phosphorylation reaction is, however, preferably effected at a temperature within the range of from 75° to 250° C., a reaction temperature within the range of from 100° to 225° C. being especially preferred.

It is also advantageous to effect the phosphorylation reaction in the presence of a Lewis acid catalyst. Examples of Lewis acids which may be used include aluminium chloride, which is the preferred catalyst, ferric chloride, stannic chloride zinc chloride titanium tetrachloride and boron trifluoride and complexes thereof with for instance diethyl ether. The proportion of catalyst present is preferably within the range of from 0.001% to 5% by weight, more preferably within the range of from 0.05% to 1% by weight, based on the weight of the butenyl phenol reactant.

The preferred phosphorylating agent is phophorus oxychloride, but alternative phosphorylating agents, for instance phosphorus oxybromide or phosphoric acid, may be employed if desired. The proportion of the butenyl phenol to that of the phosphorylating agent is advantageously within the range of from 1 to 5 moles, and especially within the range of from 2.5 to 3.5 moles, of butenyl phenol per mole of phosphorylating agent.

The tri-[p-(2-butenyl)-phenyl]-phosphite is produced by contacting p-(2-butenyl)-phenol with a phosphorus trihalide.

The process may be conveniently carried out by mixing in a reactor with agitation, the butenyl phenol with the phosphorus tri-halide, which is preferably phosphorus trichloride, and heating the mixture to an elevated temperature.

The initial mixing of the reactants is advantageously effected at a temperature substantially below the boiling-point of the phosphorus tri-halide reactant. In the preferred instances wherein phosphorus tri-chloride is employed, the initial mixing is desirably carried out at a temperature below 60° C. and preferably at a temperature within the range of from 20° and 50° C. When the mixing of the reactants is complete, the mixture may be heated to the final reaction temperature which may be, for instance, within the range of from 50° to 250° C., more preferably within the range of from 75° to 150° C. The length of the period during which heating of the reaction mixture is effected is not critical and a period of up to five hours is usually adequate.

The reaction proceeds smoothly and quickly without the use of an added catalyst although a catalyst of the Lewis acid-type may be employed if desired. If a Lewis acid is present it may be, for example, aluminium chloride, ferric chloride, stannic chloride, zinc chloride, titanium tetrachloride or boron trifluoride or complexes of the latter with, for instance, water or diethyl ether. If a catalyst is employed, the proportion of catalyst is preferably within the range of from 0.05% to 1% by weight, based on the weight of the butenyl phenol reactant.

The proportion of butenyl phenol to phosphorus trihalide employed in the process is preferably substantially the stoichiometric proportion required to replace each of the halogen atoms on the phosphorus atom by p-2-butenyl substituted phenoxy groups, that is three molar proportions of butenyl phenol per mole of phosphorus tri-halide. If desired, however, an excess amount of butenyl phenol, for instance an excess amount of up to 10% by weight, based on the weight of phosphorus tri-halide, may be employed.

There are many methods known for the production of mixtures of o- and p-(2-butenyl)phenols. These known methods generally employ a Friedel-Crafts catalyst, for instance, a Lewis acid or Bronsted acid in the reaction between butadiene and phenol. The p-(2-butenyl)phenol component may be separated from such mixtures by conventional techniques, for instance by fractional distillation, before being employed as starting-material in the phosphorylation process.

We have found that a convenient source of substantially pure p-(2-butenyl)phenol feedstock is the reaction of phenol and butadiene in the presence of a catalytic amount of a phenoxy derivative of aluminium or, preferably, zirconium.

If a phenoxy derivative of aluminium is used as the alkylation catalyst, the said alkylation process may be conveniently effected in several stages by firstly contacting the phenol starting-material and the metallic form of aluminium and heating the mixture, with agitation, until the metal dissolves. By this means, the catalyst may be formed and incorporated into the phenol reactant in a single, simple step. Although the dissolution of the metal in the phenol may be effected at any temperature above the melting-point of the phenol, a temperature within the range of from 50° to 200° C. is preferred. Moreover, it is especially preferred to conduct the dissolution at a temperature of substantially 150° C. since the metal dissolves with an exothermic effect once this temperature has been reached.

The proportion of aluminium or zirconium metal salt calculated as zirconium metal which is employed in the production of the catlayst is preferably within the range of from 0.1% to 10% by weight, more preferably within the range of from 0.1% to 2% by weight based on the total weight of phenol starting-material.

The phenol containing aluminium or zirconium phenoxide catalyst may then be contacted with butadience in a second butenylation reaction stage. The butenylation reaction may be effected, for example, at a temperature within the range of 25° to 200° C., a temperature within the range of 50° to 150° C. being particularly preferred. The butadiene is conveniently introduced into the reaction mixture by bubbling the gaseous butadiene through the mixture until the desired amount of butadiene has been absorbed by the phenol. Alternatively, the butenylation may be effected at a superatmospheric pressure of up to 200 atmospheres.

The reaction mixture containing the desired p-(2-butenyl)phenol may be purified, if desired, by for instance, removing any reacted phenol by such a method as fractional distillation. In addition, the residue after the removal of excess phenol may be washed to remove catalyst and further purified, for instance by further fractional distillation preferably under reduced pressure.

The tri-[p-(2,3-epoxybutyl)-phenyl]-phosphate is produced by contacting tri-[p-(2-butenyl)-phenyl]-phosphate or tri-[p-(2-butenyl)-phenyl]-phosphite with an epoxidising agent.

The process may be conveniently effected by adding to a solution of the butenyl phenyl phosphate or butenyl phenyl phosphite in an organic solvent, for instance acetone or chloroform, a solution of the epoxidising agent in an organic solvent, preferably the same solvent employed to make up the butenyl phosphate or phosphite solution. Advantageously, the epoxidising agent solution is added in small portions with agitation of the mixture and the temperature is maintained below the decomposition temperature of the epoxidising agent, preferably the temperature is kept below 30° C. When the addition of epoxidising agent is complete, the mixture may be allowed to stand for a period of time, for instance up to 24 hours, so that completion of the reaction may be facilitated.

The desired epoxy product may then be isolated in conventional manner, for instance by removal of the reaction solvent, taking up the residue in a water-immiscible solvent such as ether, washing the solution to neutrality, removing the water-immiscible solvent and finally purifying the residue, for instance by steam distillation to remove any steam-volatile by-products.

Epoxidising agents particularly suitable for use in the process are organic per-acids, acetic acid, per-benzoic acid and per-phthalic acid being particularly preferred. The epoxidising agent is advantageously employed in a proportion substantially in excess of the stoichiometric required to completely react with the butenyl phosphate or phosphite. Thus, for instance, it is preferred that the epoxidising agent is employed in a proportion within the range of from 3.0 to 5.0 molar proportions per molar proportion of butenyl phosphate and within the range of from 4.0 to 6.0 molar proportions per molar proportion of butenyl phosphite.

The compounds of the present invention are valuable in a wide variety of uses. For instance, they find application as a plasticiser or a stabilizer for vinyl chloride polymers and co-polymers, polyolefines, cellulose esters or other synthetic polymers. The tri-[p-(2-butenyl)-phenyl]-phosphite and -phosphate find also application in the formulation of hydraulic and other functional fluids; as ignition control or other additives for fuels; and as extreme pressure additives or other additives for lubricants. The epoxy-phosphate may also be co-polymerised with other epoxides or homopolymerised to give useful compounds.

The preferred use of the compounds of the present invention is as stabilizers for organic material. The compositions stabilized therewith show no or slight exudation after an exposure to light.

Compositions containing an organic material and a functionally effective proportion of a compound of Formula I or II or mixtures thereof may, for example, preferably comprise a synthetic polymer, for instance homopolymers of vinyl cholride, vinyl acetate or an olefine or copolymers thereof or cellulose ester and a proportion of a compound of the present invention sufficient to stabilize the polymer, for instance a proportion within the range of from 0.1% to 20% by weight. For the tri-[p-(2,3-epoxybutyl)-phenyl]-phosphate the preference is 0.5% to 10% by weight. Percent by weight is based on the total weight of the composition.

The composition may also be, for example, a hydraulic fluid or other functional fluid and a proportion of p-(2-butenyl)phenyl phosphate sufficient to render the fluid fire-resistant; a liquid hydrocarbon fuel and a proportion of p-(2-butenyl)phenyl phosphate sufficient to provide an ignition control additive; or a lubricant, especially a synthetic lubricant based on complex organic esters and a proportion of p-(2-butenyl)phenyl phosphate sufficient to provide an extreme pressure additive.

The following examples further illustrate the present invention. Parts by weight shown therein bear the same relation to parts by volume as do kilograms to litres. Parts and percentages are expressed by weight unless otherwise stated.

EXAMPLE 1

The p-(2-butenyl)phenol starting-material was prepared by each of the following methods.

(A) 9.4 parts of aluminum and 940 parts of phenol were placed in a reactor and the temperature of the mixture gradually raised while the mixture was stirred. When the temperature of the mixture reached 150° C., dissolution of the aluminium took place exothermically.

The reaction mixture was then cooled to 110° C. and gaseous butadiene was passed through the mixture until 296 parts of butadiene had been absorbed. Unreacted phenol (603 parts) was removed by distillation through an efficient fractionation column and the cooled residue was added to 200 parts by volume of concentrated hydrochloric acid and the whole stirred at 25° C. for 30 minutes. Water and diethyl ether were added to the acid solution and the ether solution was separated from the aqueous phase. The ether phase was washed three times with 200 parts by volume of water. The ether solvent was removed and the residue distilled at 10 millimetres of mercury pressure and the material boiling at up to 170° C. (477 parts) was collected.

Gas/liquid chromatographic analysis of the fraction boiling at up to 170° C. was as follows:

| Compound: | Percent by weight |
|---|---|
| (1) Phenol | 1.2 |
| (2) 2-methylchroman+2-ethylcoumaran | 2.6 |
| (3) o-(2-butenyl)phenol | 3.2 |
| (4) p-(2-butenyl)phenol | 49.8 |
| (5) 5-(2-butenyl)-2-ethylcoumaran and 6-(2-butenyl)-2-methylchroman | 36.7 |
| (6) Unknowns | 6.5 |

The yield of p-(2-butenyl)phenol was therefore 45% by weight based on the weight of consumed phenol.

The results of two similar runs II and III using different proportions of reactants are summarised in the following Table I:

TABLE I

| Run | Phenol, parts | Butadiene, parts | Al, parts | Reaction temp., °C. | Reaction time, hours | Recovered phenols, parts | Butenylated phenols, parts | Yield p-(2) butenylphenol, percent |
|---|---|---|---|---|---|---|---|---|
| II | 940 | 185 | 2.7 | 110 | 5 | 699 | 342 | 54 |
| III | 940 | 272 | 2.7 | 110 | 6 | 602 | 482 | 45 |

The GLC analysis of the butenylated phenol fraction was as follows:

| Compound | Percent by weight | |
|---|---|---|
| | Run II | Run III |
| 1 | 0.8 | 1.4 |
| 2 | 1.9 | 5.0 |
| 3 | 6.3 | 3.6 |
| 4 | 60.3 | 49.8 |
| 5 | 25.0 | 33.3 |
| 6 | 5.7 | 6.8 |

The individual components being numbered in the same way as the first run.

(B) 940 parts of phenol and 23.3 parts of zirconium tetrachloride were heated together under reflux conditions for 48 hours; a slow stream of nitrogen was passed through the reactor in order to purge the reactor from hydrogen chloride produced during the reaction.

The reaction mixture was cooled to 120° C. and butadiene was passed through the vigorously stirred mixture for 5¾ hours at 120° C. At the end of this time, the uptake of butadiene was 137 parts.

752 parts of unreacted phenol were removed from the reaction mixture by distillation through a fractionation column at 10 millimetres of mercury pressure. The residue was treated with 200 parts by volume of concentrated hydrochloric acid and the whole stirred at 25° C. for 30 minutes. Water and diethyl ether were added, the ether layer separated, washed three times with 200 parts by volume of water and finally the ether solvent removed by distillation. The material boiling up to 170° C. at 10 millimetres of mercury pressure was collected and amounted to 182.5 parts.

Gas/liquid chromatographic examinaiton of the fraction boiling at up to 170° C. was as follows:

Compound: Percent by weight
Unknowns _____ 5.5
o-(2-butenyl)phenol _____ 1.8
p-(2-butenyl)phenol _____ 79.9
5-(2-butenyl)-2-ethylcoumaran and 6-(2-butenyl)-2-methylchroman _____ 12.8

The yield of p-(2-butenyl)phenol was therefore 50% by weight based on a 20% by weight consumption of phenol. Fractional distillation of the material boiling up to 170° C. at 10 millimetres of mercury pressure gave pure p-(2-butenyl) phenol boiling at 133° C. at 10 millimetres of mercury pressure.

(C) Production of tri[p - (2 - butenyl)phenyl] phosphate.—25.6 parts of phosphorus oxychloride were added to a mixture of 77.7 parts of p-(2-butenyl)phenol and 0.5 part of anhydrous aluminium chloride while the reaction mixture was maintained at 25° C. The resulting mixture was gradually heated to 200° C. over five hours and maintained at this temperature for a further two hours under a reduced pressure of 20 millimetres of mercury. The reaction product was allowed to cool and was dissolved in 100 parts by volume of diethyl ether. The ether solution was washed successively with two portions of 2 N hydrochloric acid (2× 50 parts by volume), one portion of water (50 parts by volume), two portions of 2 N aqueous sodium hydroxide (2× 50 parts by volume) and finally three portions of water (3× 50 parts by volume). The ether solvent was removed by distillation at atmospheric pressure and volatile components of the residue were removed by heating the latter to 250° C. under 1.0 millimetre of mercury pressure. 10.0 parts of the residue (70.8 parts) was then distilled on a molecular still at 0.01 torr to give 5.0 parts of tri-[p-(2butenyl) phenyl] phosphate having the following elemental analysis by weight:

Found (percent): carbon, 74.14; hydrogen, 7.16; phosphrous, 6.42. Calculated (for $C_{30}H_{33}O_4P$) (percent): carbon, 73.75; hydrogen, 6.81; phosphorus, 6.20. The refractive index of the product was 1.5538 at 21.5° C.

Alkaline hydrolysis of the product gave p-(2-butenyl) phenol.

0.4984 part by weight of the phosphate product was dissolved in 20 parts by volume of 95% ethanol and hydrogenated using molecular hydrogen over 10% palladium on charcoal catalyst at 25° C. and at atmospheric pressure. The uptake of hydrogen was 78 parts by volume (tri-[p - (2 - butenyl)phenyl] phosphate requires 74 parts by volume).

EXAMPLE 2

Production of tri-[p-(2-butenyl)phenyl] phosphite 6.9 parts of phosphorus tri-chloride were added dropwise, at 30° C., to 22.9 parts of p-(2-butenyl)phenol over a period of 15 minutes. When the addition was complete, the mixture was stirred at 30° C. for a further 15 minutes, heated to 100° C. over a period of one hour and then held at 100° C. for a further hour. Distillation of the reaction mixture under nitrogen gave a fraction (2.6 parts) boiling up to 200° C. at 0.5 millimetre of mercury pressure, a fraction (18.5 parts) boiling in the range of from 200° to 287° C. (virtually all at 287° C.) at 0.5 millimetre of mercury pressure and 1.5 parts of residue.

The main fraction had a refractive index at 21.5° C. of 1.5671 and the following elemental analysis by weight:

Found (percent): carbon, 75.77; hydrogen, 6.82; phosphorus, 6.53. Calculated (for $C_{30}H_{33}O_3P$) (percent): carbon, 76.25; hydrogen, 7.04; phosphorus, 6.4.

Moreover, alkaline hydrolysis of the tri-[p-(2-butenyl) phenyl]phosphite gave p-(2-butenyl)phenol indicating that no isomerisation of the p-(2-butenyl)phenol starting-material had occcurred during reaction with phosphorus trichloride.

EXAMPLES 3–4

The following two compositions were made up:

100 parts of a polyvinyl chloride having a K value of 70 (as determined according to Fibentscher using a 0.5% cyclohexanone solution)
54 parts of di-alphanol 79 phthalate
2.8 parts of a barium/cadmium stabiliser
1.0 part of a zinc stabiliser
0.7 part of a phosphite chelating agent
4.0 parts of compound of Formula I The two compositions one containing the phosphite compound of Formula I and the other containing the phosphate compound of Formula I were formulated into polyvinyl chloride film by milling the above compositions for 15 minutes at 160° C.

The film samples were then tested for stability to heat and light.

The heat stability tests were conducted in an oven maintained at 170° C. The times taken for the respective samples to become yellow and subsequently turn black were noted.

The exudation tests were carried out by exposing pressed samples, having a thickness of 0.05 inch, of the polyvinyl chloride film formulations to a "Xenotest" lamp.

After 183 hours, the degree of exudation of additives from the polymer were assessed.

The results of the stability test are summarised in the following Table II. For the purpose of comparison, results are also included for polyvinyl chloride formulated as defined above but containing no phosphate or phosphite ester of Formula I.

TABLE II

| Example | Additive | Heat stability | | Exposure to light (183 hours) exudation |
|---------|----------|----------------|-----|---------|
| | | Time to yellow (mins.) | Time to blacken (mins.) | |
| | None | 70 | 90 | Considerable. |
| 3 | Tri-[p-(2-butenyl)phenyl] phosphate. | 90 | 110 | Nil. |
| 4 | Tri-[p-(2-butenyl)phenyl] phosphite. | 110 | 120 | Nil. |

The foregoing results demonstrate the excellent stabilising effect of the compounds of the present invention in polyvinyl chloride film.

EXAMPLE 5

To a solution of 9.6 parts of tri-[p-(2-butenyl)-phenyl]phosphite in 30 parts by volume of acetone, there were added dropwise 90 parts by volume of an acetone solution containing 0.125 part by weight/part by volume of perbenzoic acid. During the addition, the temperature of the reaction mixture was not allowed to exceed 30° C. When the addition was complete, the reaction mixture was allowed to stand at 25° C. for 15 hours.

The acetone solvent was then removed by distillation at 25° C. under reduced pressure and the residue was dissolved in ether. The ether extract was washed with dilute aqueous sodium hydroxide solution until the washings were colourless and alkaline and then with water to neutrality. The ether solvent was evaporated and the residue steam-distilled to remove benzaldehyde which was present in the original perbenzoic acid solution.

The residue was again taken up in ether solvent and washed successively again with dilute aqueous sodium hydroxide solution and water to neutrality. The ether extract was dried over anhydrous potassium carbonate and the ether solvent was then removed under reduced pressure. After filtration, 9.7 parts of tri-[p-(2,3-epoxybutyl)-phenyl]phosphate was obtained as a viscous oil having the following elemental analysis by weight:

Found (percent): carbon, 66.25; hydrogen, 6.16; phosphorus, 5.88. Calculated (for $C_{30}H_{33}PO_7$) (percent): carbon, 67.2; hydrogen, 6.15; phosphorus, 5.78.

EXAMPLE 6

By replacing tri-[p-(2-butenyl)phenyl]phosphite used in Example 5 by the equivalent amount of tri-[p-(2-butenyl)phenyl]phosphate, the remaining process conditions being the same, tri-[p-(2,3-epoxybutyl)phenyl]phosphate may be obtained in similar yield to that in Example 5.

EXAMPLE 7

The following formulation was made up:

100 parts of polyvinyl chloride having a K value (Fibentscher) of 70 in a 0.5% cyclohexanone solution
54 parts of di-alphanol 79 phthalate
2.8 parts of a barium/cadmium stabiliser
1.0 part of a zinc stabiliser
0.7 part of a phosphite chelating agent
4.0 parts of tri-[p-(2,3-epoxybutyl)phenyl]phosphate.

This composition was formulated into polyvinyl chloride film by milling the composition for 15 minutes at 160° C.

The film samples were then tested for stability to light and heat.

The heat stability test was conducted in an oven maintained at 170° C. The times taken for the sample to become yellow and subsequently turn black were noted.

The light stability test was carried out by exposing a pressed sample, having a thickness of 0.05 inch, of the polyvinyl chloride film formulation to a "Xenotest" lamp. After 183 hours, the visual appearance and the degree of exudation of the additives from the polymer were assessed.

The results of the stability tests are summarised in the following Table III. For the purpose of comparison, results are included for polyvinyl chloride formulated as defined above but not containing the epoxy phosphate of the present invention.

Table III

| Ex. | Additive | Heat stability | | Light stability, appearance after 183 hours | Exudation |
|-----|----------|-------|-----|-----|-----|
| | | Time to yellow (mins.) | Time to blacken (mins.) | | |
| | None | 70 | 90 | Good | Considerable. |
| 7 | Tri-[p-(2,3-epoxybutyl)phenyl] phosphate. | 140 | 210 | do | Slight. |

The result in the foregoing table demonstrate the excellent heat and light stabilising effect of the compound of the present invention in polyvinyl chloride film.

What we claim is:
1. Tri-[p-(2-butenyl)-phenyl]-phosphite.

References Cited

UNITED STATES PATENTS 2,977,374    3/1961    Phillips et al. _____ 260—956 X

LEWIS GOTTS, Primary Examiner

A. H. SUTTON, Assistant Examiner

U.S. Cl. X.R.

44—76, DIG 4; 106—177; 252—49.8, 78; 260—2 EP, 30.6 R, 45.7 P, 45.8 A, 348 R, 348.5 L, 621 R, 974, 976, 978